(12) United States Patent
Yamamoto et al.

(10) Patent No.: US 9,227,636 B2
(45) Date of Patent: Jan. 5, 2016

(54) POWER TRANSMISSION DEVICE

(71) Applicant: HONDA MOTOR CO., LTD., Tokyo (JP)

(72) Inventors: Kazuhisa Yamamoto, Saitama (JP); Kumiko Ohya, Saitama (JP); Takashi Horiguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/614,749

(22) Filed: Feb. 5, 2015

(65) Prior Publication Data

US 2015/0232100 A1    Aug. 20, 2015

(30) Foreign Application Priority Data

Feb. 14, 2014    (JP) .................................. 2014-026567

(51) Int. Cl.
| | |
|---|---|
| B60W 30/19 | (2012.01) |
| F16H 63/48 | (2006.01) |
| F16H 61/20 | (2006.01) |
| B60W 10/115 | (2012.01) |
| B60W 10/18 | (2012.01) |
| B60W 10/184 | (2012.01) |
| B60K 6/365 | (2007.10) |

(52) U.S. Cl.
CPC ................ *B60W 30/19* (2013.01); *B60K 6/365* (2013.01); *B60W 10/115* (2013.01); *B60W 10/182* (2013.01); *B60W 10/184* (2013.01); *F16H 61/20* (2013.01); *F16H 63/486* (2013.01)

(58) Field of Classification Search
CPC . B60W 30/19; B60W 10/115; B60W 10/182; B60W 10/184; F16H 63/486; F16H 61/20; B60K 6/365
See application file for complete search history.

(56) References Cited

U.S. PATENT DOCUMENTS

| | | | | |
|---|---|---|---|---|
| 6,966,866 | B2 * | 11/2005 | Ando | B60K 6/445 180/65.235 |
| 7,462,121 | B2 * | 12/2008 | Janson | B60K 6/387 475/214 |
| 7,597,165 | B2 * | 10/2009 | Kaneko | B60K 6/442 180/65.285 |
| 7,789,177 | B2 * | 9/2010 | Endo | B60K 6/445 180/65.265 |
| 7,972,237 | B2 * | 7/2011 | Ota | B60K 6/445 180/65.7 |
| 8,827,852 | B2 * | 9/2014 | Ikegami | B60K 6/36 475/5 |
| 8,888,636 | B2 * | 11/2014 | Ikegami | B60K 6/365 475/207 |
| 9,114,700 | B2 * | 8/2015 | Park | B60K 6/547 |
| 2010/0125020 | A1 * | 5/2010 | Ikegami | B60K 6/365 477/3 |
| 2015/0057126 | A1 * | 2/2015 | Harada | B60K 6/445 477/4 |

FOREIGN PATENT DOCUMENTS

| | | |
|---|---|---|
| JP | 4506097 B2 | 7/2010 |
| JP | 2013-174284 A | 9/2013 |

* cited by examiner

*Primary Examiner* — Derek D Knight
(74) *Attorney, Agent, or Firm* — Squire Patton Boggs (US) LLP (57) ABSTRACT

A power transmission device includes a synchronous meshing mechanism, a braking mechanism, a shift mechanism, a parking gear, a parking mechanism, and a control unit. In the case where the shift mechanism is switched to a parking range, the control unit performs braking continuation processing for continuing the braking of the braking mechanism (step 4) regardless of a driver's braking operation, inhibits the rotation of the driven gear shaft by the parking mechanism, places a predetermined synchronous meshing mechanism in a connected state as a preparation for starting up the vehicle again, and then ends the braking continuation processing (step 5).

7 Claims, 3 Drawing Sheets

POWER TRANSMISSION DEVICE

BACKGROUND OF THE INVENTION

1. Field of the Invention

The present invention relates to a power transmission device including a plurality of gear trains which establish a plurality of variable speed stages and a meshing mechanism which fixes gears constituting the gear trains to a shaft.

2. Description of the Related Art

Conventionally, there is known a power transmission device which includes a plurality of gear trains that establish a plurality of variable speed stages and a meshing mechanism that freely fixes gears constituting the gear trains to a shaft (for example, refer to Japanese Patent Application Laid-Open No. 2013-174284).

Moreover, the power transmission device is generally provided with a parking mechanism which inhibits the rotation of an output shaft by locking a parking gear in the case of switching to a parking range by a driver's shift operation (for example, refer to Japanese Patent No. 4506097).

When a vehicle transitions to a parking state in response to a driver's shift operation, an engaging portion engages with a parking gear, thereby causing a locked state in which the rotation of an output shaft is inhibited. Moreover, generally, when switching to a parking range by a shift operation, the driver is required to continue to depress a brake pedal. After the completion of switching to the parking range, the driver takes his/her foot off the brake pedal.

At this time, the parking gear is locked. In the case of parking on an uphill road or the like, however, the braked drive wheels are released and a vehicle moves to descend the inclined surface by a clearance of the engagement until the parking is locked. Thereafter, the vehicle weight is applied to the output shaft, thereby generating a torsional torque.

Therefore, in the case where the driver wants to preshift to a forward stage or other gear in preparation for the next startup, a synchronous meshing mechanism may be affected by a torsional torque, which may inhibit a transition to a connected state.

SUMMARY OF THE INVENTION

In view of the above problem, it is an object of the present invention to provide a power transmission device capable of quickly completing the preshift for startup in a parking state.

In order to achieve the above object, according to an aspect of the present invention, there is provided a power transmission device including: an input shaft which is rotated by power of a drive source; and an output shaft arranged in parallel with the input shaft, wherein a rotational speed of the input shaft is changed to a plurality of stages and output from the output shaft via a plurality of gear trains with different transmission gear ratios each having a drive gear and a driven gear meshing therewith, the power transmission device comprising: a drive gear shaft which fixes or rotatably supports the drive gears of the plurality of gear trains; a driven gear shaft which rotatably supports or fixes the driven gears of the plurality of gear trains; a meshing mechanism which selects any one of the gear trains and connects a gear rotatably supported by the drive gear shaft or the driven gear shaft among the drive gear and the driven gear of the selected gear train to the corresponding shaft to enable power transmission between the drive gear shaft and the driven gear shaft by using the selected gear train; a braking mechanism which brakes drive wheels according to a driver's braking operation; a shift mechanism capable of switching between a running range and a parking range; a parking mechanism, which has a parking gear to which the rotation of the driven gear shaft is transmitted and an engaging portion which engages with the parking gear to inhibit the rotation thereof, inhibits the rotation of the driven gear shaft by inhibiting the rotation of the parking gear; and a control unit which controls the meshing mechanism, the braking mechanism, and the parking mechanism, wherein the control unit performs braking continuation processing for continuing braking of the braking mechanism regardless of the driver's braking operation in a case where the shift mechanism is switched to the parking range, inhibits the rotation of the driven gear shaft by the parking mechanism, places the predetermined meshing mechanism in a connected state as a preparation for starting up the vehicle again, and then ends the braking continuation processing.

According to the aspect of the present invention, the control unit performs braking continuation processing for continuing the braking of the wheels by using the braking mechanism when the driver is not performing the braking operation in the case where the shift mechanism is switched to the parking range. Then, the control unit inhibits the rotation of the driven gear shaft with the parking mechanism and places the predetermined meshing mechanism in the connected state as a preparation (preshift) for starting up the vehicle again and thereafter ends the braking continuation processing.

Thereby, for example, even in the case where the vehicle is parking on an uphill road or the like, the vehicle weight is applied to the output shaft until the preshift is completed, thereby preventing an occurrence of a torsional torque. Therefore, according to the present invention, completion of preshift is quickly enabled during braking continuation processing even in a situation where a torsional torque might occur in the parking state.

Moreover, in the present invention, the power transmission device further includes a gradient detection unit capable of detecting a gradient of a road surface and the control unit may be configured to perform the braking continuation processing in a case of detecting the gradient.

Furthermore, in the present invention, the parking gear may be provided so as to integrally rotate by spline connection in gears constituting a predetermined gear train for establishing a predetermined speed stage.

Still further, in the present invention, the gear train includes a drive gear and a driven gear to which the rotation of the drive gear is transmitted; the drive gear is rotatably supported by the drive gear shaft; the driven gear is fixed to the driven gear shaft; the meshing mechanism is able to selectively connect any one of the drive gears of the plurality of gear trains to the drive gear shaft; and the parking gear is provided so as to integrally rotate with the drive gear.

Specifically, in the case of providing the parking gear in the rotatably-supported drive gear, the torque might further increase when the vehicle weight is applied to the parking mechanism by a clearance of the meshing portion of the gear train. Therefore, the present invention provides a working effect particularly in the power transmission device where the rotatably-supported drive gear is provided with the parking gear.

Furthermore, according to another aspect of the present invention, there is provided a method of controlling a power transmission device including an input shaft which is rotated by power of a drive source and an output shaft arranged in parallel with the input shaft, wherein the rotational speed of the input shaft is changed to a plurality of stages and output from the output shaft via a plurality of gear trains with different transmission gear ratios each having a drive gear and a driven gear meshing therewith, the power transmission device including: a drive gear shaft which fixes or rotatably supports the drive gears of the plurality of gear trains; a driven gear shaft which rotatably supports or fixes the driven gears of the plurality of gear trains; a meshing mechanism which selects any one of the gear trains and connects a gear rotatably supported by the drive gear shaft or the driven gear shaft among the drive gear and the driven gear of the selected gear train to the corresponding shaft to enable power transmission between the drive gear shaft and the driven gear shaft by using the selected gear train; a braking mechanism which brakes drive wheels according to a driver's braking operation; a shift mechanism capable of switching between a running range and a parking range; a parking mechanism, which has a parking gear to which the rotation of the driven gear shaft is transmitted and an engaging portion which engages with the parking gear to inhibit the rotation thereof, inhibits the rotation of the driven gear shaft by inhibiting the rotation of the parking gear; and a control unit which controls the meshing mechanism, the braking mechanism, and the parking mechanism, the method of controlling the power transmission device including the steps of performing braking continuation processing step which performs braking continuation processing for continuing braking of the braking mechanism regardless of the driver's braking operation in a case where the shift mechanism is switched to the parking range by using the control unit; and an ending step for inhibiting rotation of the driven gear shaft by the parking mechanism, placing the predetermined meshing mechanism in a connected state as a preparation for starting up the vehicle again, and then ending the braking continuation processing by using the control unit.

DESCRIPTION OF THE PREFERRED EMBODIMENTS

Figure 1:
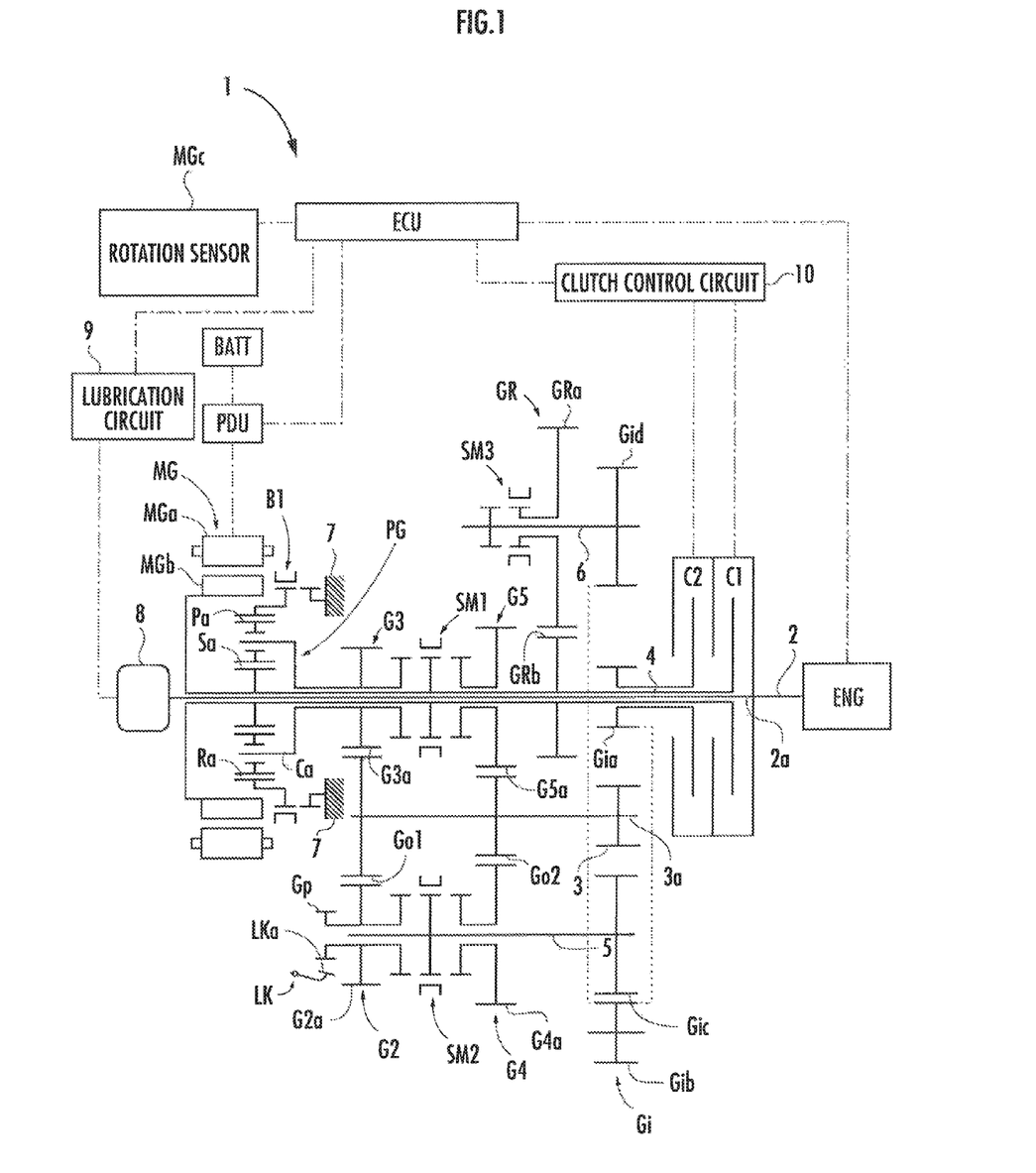
FIG. 1 is a skeleton diagram illustrating an embodiment of a power transmission device according to the present invention.

FIG. 1 illustrates a power transmission device 1 of this embodiment. The power transmission device 1 is mounted on a vehicle such as an automobile and includes an input shaft 2 to which a driving force (output torque) of an internal combustion engine ENG as a drive source is transmitted, an output shaft 3a having an output gear 3 which outputs power to right and left front wheels as drive wheels via a differential gear not illustrated, and a plurality of gear trains G2 to G5 with different transmission gear ratios.

Moreover, the power transmission device 1 includes a first drive gear shaft 4 which rotatably supports drive gears G3a and G5a of odd-numbered gear trains G3 and G5 which establish each odd-numbered variable speed stage in the gear ratio rank, a second drive gear shaft 5 which rotatably supports drive gears G2a and G4a of even-numbered gear trains G2 and G4 which establish each even-numbered variable speed stage in the gear ratio rank, and a reverse shaft 6 which rotatably supports a reverse drive gear GRa of a gear train GR for a backward stage which is used to establish a backward stage and includes a reverse drive gear GRa and a reverse driven gear GRb. The first drive gear shaft 4 is arranged on the same axis as the input shaft 2 and the second drive gear shaft 5 is arranged in parallel with the first drive gear shaft 4.

Furthermore, the power transmission device 1 includes an idle gear train Gi composed of an idle drive gear Gia which is rotatably supported by the first drive gear shaft 4, a first idle driven gear Gib which meshes with the idle drive gear Gia, a second idle driven gear Gic which meshes with the first idle driven gear Gib and is fixed to the second drive gear shaft 5, and a third idle driven gear Gid which meshes with the first idle driven gear Gib and is fixed to the reverse shaft 6.

The power transmission device 1 includes a first clutch C1 and a second clutch C2 each of which is composed of a hydraulic-actuated type wet friction clutch. The first clutch C1 is able to be switched between a transmission state in which a driving force of an internal combustion engine ENG transmitted to the input shaft 2 is transmitted to the first drive gear shaft 4 and a released state in which the transmission is cut off. The second clutch C2 is able to be switched between a transmission state in which a driving force of the internal combustion engine ENG transmitted to the input shaft 2 is transmitted to the second drive gear shaft 5 and a released state in which the transmission is cut off.

The clutches C1 and C2 are switched in state by hydraulic pressure supplied from a clutch control circuit 10. Moreover, the clutches C1 and C2 are able to adjust a fastening pressure in the transmission state by adjusting a hydraulic pressure by using an actuator (not illustrated) included in the clutch control circuit 10 (also able to be placed in a so-called half-clutch state).

The lubrication circuit 9 is supplied with lubricant oil from a pump 8. The lubrication circuit 9 includes an oil passage for distributing lubrication oil to places that require lubrication in the power transmission device 1 such as the clutches C1 and C2. The pump 8 is arranged at an end on the opposite side to the internal combustion engine ENG and coaxially with the input shaft 2 and driven by the internal combustion engine ENG via a pump shaft 2a which passes through the first drive gear shaft 4, which is hollow, and is connected to the input shaft 2.

Similarly to the pump 8, the lubrication circuit 9 is arranged at an end on the opposite side to the internal combustion engine ENG and coaxially with the input shaft 2.

Moreover, the power transmission device 1 includes a planetary gear mechanism PG which is arranged coaxially with the input shaft 2 and in a position closer to the internal combustion engine ENG side than the pump 8 is. The planetary gear mechanism PG is of a single pinion type which includes a sun gear Sa, a ring gear Ra, a carrier Ca which supports a pinion Pa meshing with the sun gear Sa and the ring gear Ra in such a way that it is rotatable about its axis and revolvable.

Assuming that the three elements including the sun gear Sa, the carrier Ca, and the ring gear Ra of the planetary gear mechanism PG are defined as a first element, a second element, and a third element, respectively, viewed from the sun gear Sa side (one side) in an arrangement order of intervals corresponding to the gear ratios in a collinear diagram (a diagram which represents relative rotation speeds of the elements by using a straight line), the first element is the sun gear Sa, the second element is the carrier Ca, and the third element is the ring gear Ra.

Moreover, assuming that the gear ratio of the planetary gear mechanism PG (the number of teeth of the ring gear Ra/the number of teeth of the sun gear Sa) is defined as g, the ratio of the interval between the sun gear Sa as the first element and the carrier Ca as the second element to the interval between the carrier Ca as the second element and the ring gear Ra as the third element is set at g:1 in the collinear diagram.

The sun gear Sa as the first element is fixed to the first drive gear shaft 4. The carrier Ca as the second element is connected to the third speed drive gear G3a of the third speed gear train G3. The ring gear Ra as the third element is releasably fixed to the transmission case 7 by using a locking mechanism B1 (brake).

The locking mechanism B1 (brake) is composed of a synchronous meshing mechanism and is switchable between a fixed state in which the ring gear Ra (the third element) is fixed to the transmission case 7 and a released state in which the fixing is released.

Moreover, the planetary gear mechanism PG may be of a double pinion type which includes a sun gear, a ring gear, a carrier which supports a pair of pinions meshing with each other with one meshing with the sun gear and the other meshing with the ring gear in such a way that it is rotatable about its axis and revolvable. In this case, for example, the sun gear (the first element) is fixed to the first drive gear shaft 4, the ring gear (the second element) is connected to the third speed drive gear G3a of the third speed gear train G3, and the carrier (the third element) is releasably fixed to the transmission case 7 by using the locking mechanism B1 (brake).

In the radially outside of the planetary gear mechanism PG, a hollow electric motor generator MG which is a rotary electric machine is arranged. In other words, the planetary gear mechanism PG is arranged in the inside of the hollow motor generator MG. The motor generator MG includes a stator MGa and a rotor MGb. The rotor MGb includes a rotor hub which is located between the pump 8 and a planetary gear mechanism PG and extends toward the input shaft 2 side. The rotor hub is connected to the first drive gear shaft 4 by spline connection.

Moreover, the motor generator MG is controlled via a power drive unit PDU on the basis of an instruction signal of the power control device ECU (electronic control unit), and the power control device ECU appropriately switches the power drive unit PDU between a drive state in which the motor generator MG is driven by consuming the electric power of a secondary battery BATT and a regenerative state in which the rotational force of the rotor MGb is suppressed to generate electric power and the secondary battery BATT is charged with the generated electric power via the power drive unit PDU.

Furthermore, the motor generator MG is provided with a rotation sensor MGc which detects the rotational speed of the motor generator MG (the rotational speed of the rotor MGb). The rotation sensor MGc is configured to freely transmit the detected rotational speed of the motor generator MG to the power control device ECU.

The power control device ECU, which is an electronic unit composed of a CPU, a memory, and the like, executes a control program stored in a storage unit such as a memory by using the CPU and corresponds to a control unit of the present invention. The power control device ECU receives an input of a signal from a shift mechanism which is switched to one of the forward range, the neutral range, the backward range, and the parking range in response to a driver's shift operation. Moreover, the power control device ECU receives an input of operational information on a braking mechanism which brakes the wheels by a braking operation through a driver's depression of the brake pedal.

A reverse driven gear GRb, which meshes with a reverse drive gear GRa of a gear train GR for a backward stage rotatably supported by the reverse shaft 6, is fixed to the first drive gear shaft 4. A first driven gear Go1, which meshes with the second speed drive gear G2a and the third speed drive gear G3a, is fixed to the output shaft 3a which rotatably supports the output gear 3. Moreover, a second driven gear Go2, which meshes with the fourth speed drive gear G4a and the fifth speed drive gear G5a, is fixed to the output shaft 3a.

One gear Go1 and one gear Go2 are used as the driven gears for the second speed gear train G2 and the third speed gear train G3 and as the driven gears for the fourth speed gear train G4 and the fifth speed gear train G5, respectively in this manner, thereby enabling a reduction in the axis length (axial dimension) of the power transmission device 1 and an improvement in mountability on a vehicle of FF (front engine front drive) type.

The first drive gear shaft 4 is provided with a first meshing mechanism SM1, which is composed of a synchronous meshing mechanism and is switchable to any one of the states: a third speed side connected state in which the third speed drive gear G3a is connected to the first drive gear shaft 4, a fifth speed side connected state in which the fifth speed drive gear G5a is connected to the first drive gear shaft 4, and a neutral state in which the connections between the third speed drive gear G3a and the first drive gear shaft 4 and between the fifth speed drive gear G5a and the first drive gear shaft 4 are cut off.

The second drive gear shaft 5 is provided with a second meshing mechanism SM2, which is composed of a synchronous meshing mechanism and is switchable to any one of the states: a second speed side connected state in which the second speed drive gear G2a is connected to the second drive gear shaft 5, a fourth speed side connected state in which the fourth speed drive gear G4a is connected to the second drive gear shaft 5, and a neutral state in which the connections between the second speed drive gear G2a and the second drive gear shaft 5 and between the fourth speed drive gear G4a and the second drive gear shaft 5 are cut off.

The reverse shaft 6 is provided with a third meshing mechanism SM3, which is composed of a synchronous meshing mechanism and is switchable to either one of the states: a connected state in which the reverse drive gear GRa is connected to the reverse shaft 6 and a neutral state in which the connection is cut off.

Moreover, the power control device ECU controls an actuator (not illustrate) of the clutch control circuit 10 to switch the clutches C1 and C2 between the transmission state and the released state by adjusting the hydraulic pressure.

A parking gear Gp is connected integrally rotatably to the second speed drive gear G2a by spline connection so as to be juxtaposed to the second speed drive gear G2a in an axial direction. Furthermore, the power transmission device 1 of this embodiment is provided with an engaging portion LKa composed of a parking pawl engageable with the parking gear Gp. The parking gear Gp and the engaging portion LKa constitute a parking mechanism LK of this embodiment. The parking mechanism LK operates by an instruction of the power control device ECU.

Subsequently, the operation of the power transmission device 1 having the above configuration will be described. In the power transmission device 1 of this embodiment, an engagement of the first clutch C1 enables the start of the internal combustion engine ENG by using the driving force of the motor generator MG.

First, to establish the first speed stage by using the driving force of the internal combustion engine ENG, the ring gear Ra of the planetary gear mechanism PG is fixed to the transmission case 7 with the locking mechanism B1 (brake) in a fixed state and the first clutch C1 is fastened to achieve a transmission state.

The driving force of the internal combustion engine ENG is input to the sun gear Sa of the planetary gear mechanism PG via the input shaft 2, the first clutch C1, and the first drive gear shaft 4 and then is transmitted to the third speed drive gear G3a via the carrier Ca with the rotational speed of the internal combustion engine ENG input to the input shaft 2 decreased to 1/(g+1).

The driving force transmitted to the third speed drive gear G3a is changed to 1/i(g+1), where i is the gear ratio of the third speed gear train G3 composed of a third speed drive gear G3a and the first driven gear Go1 (the number of teeth of the third speed drive gear G3a/the number of teeth of the first driven gear Go1), and is output from the output gear 3 via the first driven gear Go1 and the output shaft 3a, by which the first speed stage is established.

In this manner, the power transmission device 1 of this embodiment enables the establishment of the first speed stage by the planetary gear mechanism PG and the third speed gear train, thereby eliminating the need for a meshing mechanism exclusive to the first speed stage, and the planetary gear mechanism PG is arranged within the hollow motor generator MG, thereby enabling a further reduction in the axis length of the power transmission device 1.

In the case where the vehicle is in a deceleration state and the charging rate SOC (state of charge) of the secondary battery BATT is less than a predetermined value in the first speed stage, the power control device ECU performs deceleration regeneration operation for generating electric power by braking the vehicle through the motor generator MG. Moreover, in the case where the charging rate SOC of the secondary battery BATT is equal to or greater than the predetermined value, the vehicle is able to perform the hybrid electric vehicle (HEV) running in which the driving force of the internal combustion engine ENG is supplemented by driving the motor generator MG or the electric vehicle (EV) running in which the vehicle runs only with the driving force of the motor generator MG.

Moreover, in the case where the deceleration of the vehicle is allowed under the EV running and the vehicle speed is equal to or more than a fixed speed, the internal combustion engine ENG is able to be started by using the motion energy of the vehicle, without using the driving force of the motor generator MG, by gradually fastening the first clutch C1.

In the case where the power control device ECU predicts an upshift to the second speed stage during running in the first speed stage from the vehicle information such as the vehicle speed or an opening degree of an accelerator pedal, the second meshing mechanism SM2 is placed in a second speed side connected state in which the second speed drive gear G2a and the second drive gear shaft 5 are connected to each other or in a preshift state in which the second meshing mechanism SM2 is brought close to the second speed side connected state.

To establish the second speed stage by using the driving force of the internal combustion engine ENG, the second meshing mechanism SM2 is placed in a second speed side connected state in which the second speed drive gear G2a and the second drive gear shaft 5 are connected to each other, the first clutch C1 is placed in a released state, and the second clutch C2 is fastened to achieve a transmission state. Thereby, the driving force of the internal combustion engine ENG is output from the output gear 3 via the second clutch C2, the idle gear train Gi, the second drive gear shaft 5, the second speed gear train G2, and the output shaft 3a.

In the case where the power control device ECU predicts an upshift in the second speed stage, the first meshing mechanism SM1 is placed in a third speed side connected state in which the third speed drive gear G3a and the first drive gear shaft 4 are connected to each other or in a preshift state in which the first meshing mechanism SM1 is brought close to the third speed side connected state.

On the other hand, in the case where the power control device ECU predicts a downshift, the first meshing mechanism SM1 is placed in a neutral state in which the connections between the third speed drive gear G3a and the first drive gear shaft 4 and between the fifth speed drive gear G5a and the first drive gear shaft 4 are cut off.

This enables the upshift or downshift only by placing the first clutch C1 in the transmission state and the second clutch C2 in the released state, thereby enabling smooth switching of the variable speed stage without intermission of the driving force.

Furthermore, also in the case where the vehicle is in a deceleration state and the charging rate SOC of the secondary battery BATT is less than a predetermined value in the second speed stage, the power control device ECU performs deceleration regeneration operation. In the case where the deceleration regeneration operation is performed in the second speed stage, the operation depends on whether the first meshing mechanism SM1 is in the third speed side connected state or in the neutral state.

In the case where the first meshing mechanism SM1 is in the third speed side connected state, the third speed drive gear G3a which is rotated by the first driven gear Go1 rotated by the second speed drive gear G2a rotates the rotor MGb of the motor generator MG via the first drive gear shaft 4. Therefore, the rotation of the rotor MGb is suppressed for braking to generate electric power for regeneration.

In the case where the first meshing mechanism SM1 is in the neutral state, the locking mechanism B1 is placed in a fixed state to set the rotational speed of the ring gear Ra to zero, and the rotational speed of the carrier Ca which rotates along with the third speed drive gear G3a meshing with the first driven gear Go1 is suppressed for braking by generating electric power with the motor generator MG connected to the sun gear Sa for regeneration.

Moreover, to perform HEV running in the second speed stage, for example, the first meshing mechanism SM1 is placed in a third speed side connected state in which the third speed drive gear G3a and the first drive gear shaft 4 are connected to each other to place the planetary gear mechanism PG in a locked state in which the respective elements are not rotatable relatively and the driving force of the motor generator MG is transmitted to the output gear 3 via the third speed gear train G3, thereby enabling the HEV running in the second speed stage. Alternatively, the HEV running in the second speed stage is also achieved by placing the first meshing mechanism SM1 in the neutral state, causing the rotational speed of the ring gear Ra to be zero with the locking mechanism B1 (brake) in a reverse rotation inhibited state, and transmitting the driving force of the motor generator MG to the first driven gear Go1 through a path of the first speed stage.

To establish the third speed stage by using the driving force of the internal combustion engine ENG, the first meshing mechanism SM1 is placed in the third speed side connected state in which the third speed drive gear G3a and the first drive gear shaft 4 are connected to each other, the second clutch C2 is placed in the released state, and the first clutch C1 is fastened to achieve the transmission state. Thereby, the driving force of the internal combustion engine ENG is transmitted to the output gear 3 via the input shaft 2, the first clutch C1, the first drive gear shaft 4, the first meshing mechanism SM1, and the third speed gear train G3 and is output with the rotational speed of 1/i.

In the third speed stage, the first meshing mechanism SM1 is placed in the third speed side connected state in which the third speed drive gear G3a and the first drive gear shaft 4 are connected to each other and therefore the sun gear Sa and the carrier Ca of the planetary gear mechanism PG rotate in the same way.

Therefore, the respective elements of the planetary gear mechanism PG are placed in a locked state in which the elements are not rotatable relatively. In addition, the deceleration regeneration is achieved by braking the sun gear Sa by the motor generator MG and HEV running is achieved by transmitting the driving force to the sun gear Sa by the motor generator MG. Moreover, EV running where the vehicle runs only with the driving force of the motor generator MG is enabled by releasing the first clutch C1.

In the third speed stage, the power control device ECU places the second meshing mechanism SM2 in the second speed side connected state in which the second speed drive gear G2a and the second drive gear shaft 5 are connected to each other or in a preshift state in which the second meshing mechanism SM2 is brought close to the second speed side connected state in the case of predicting a downshift on the basis of vehicle information such as the vehicle speed or an opening degree of an accelerator pedal. In the case of predicting an upshift, the power control device ECU places the second meshing mechanism SM2 in the fourth speed side connected state in which the fourth speed drive gear G4a and the second drive gear shaft 5 are connected to each other or in a preshift state in which the second meshing mechanism SM2 is brought close to the fourth speed side connected state.

This enables the switching of the variable speed stage only by fastening the second clutch C2 to achieve the transmission state and releasing the first clutch C1 to achieve the released state, thereby enabling smooth gear change without intermission of the driving force.

To establish the fourth speed stage by using the driving force of the internal combustion engine ENG, the second meshing mechanism SM2 is placed in the fourth speed side connected state in which the fourth speed drive gear G4a and the second drive gear shaft 5 are connected to each other, the first clutch C1 is placed in the released state, and the second clutch C2 is fastened to achieve the transmission state.

During running in the fourth speed stage, the first meshing mechanism SM1 is placed in a third speed side connected state in which the third speed drive gear G3a and the first drive gear shaft 4 are connected to each other or in a preshift state in which the first meshing mechanism SM1 is brought close to the third speed side connected state in the case where the power control device ECU predicts a downshift from the vehicle information.

On the other hand, in the case where the power control device ECU predicts an upshift from the vehicle information, the first meshing mechanism SM1 is placed in a fifth speed side connected state in which the fifth speed drive gear G5a and the first drive gear shaft 4 are connected to each other or in a preshift state in which the first meshing mechanism SM1 is brought close to the fifth speed side connected state. This enables the downshift or upshift only by fastening the first clutch C1 to achieve the transmission state and releasing the second clutch C2 to achieve the released state, thereby enabling smooth gear change without intermission of the driving force.

To perform deceleration regeneration or HEV running during running in the fourth speed stage, the first meshing mechanism SM1 is placed in a third speed side connected state in which the third speed drive gear G3a and the first drive gear shaft 4 are connected to each other in the case where the power control device ECU predicts a downshift, thereby enabling the deceleration regeneration by braking using the motor generator MG and enabling the HEV running by transmitting the driving force.

In the case where the power control device ECU predicts an upshift, the first meshing mechanism SM1 is placed in a fifth speed side connected state where the fifth speed drive gear G5a and the first drive gear shaft 4 are connected to each other, thereby enabling the deceleration regeneration by braking using the motor generator MG and enabling the HEV running by transmitting the driving force from the motor generator MG.

To establish the fifth speed stage by using the driving force of the internal combustion engine ENG, the first meshing mechanism SM1 is placed in a fifth speed side connected state in which the fifth speed drive gear G5a and the first drive gear shaft 4 are connected to each other, the second clutch C2 is placed in the released state, and the first clutch C1 is fastened to achieve the transmission state. In the fifth speed stage, the first clutch C1 is placed in the transmission state, by which the internal combustion engine ENG is directly connected to the motor generator MG, and therefore the HEV running is enabled by outputting the driving force from the motor generator MG and deceleration regeneration is enabled by braking using the motor generator MG and generating electric power.

In the case of performing the EV running in the fifth speed stage, the first clutch C1 is also placed in the released state as well as the second clutch C2. In addition, the internal combustion engine ENG can also be started by gradually fastening the first clutch C1 during EV running in the fifth speed stage.

In the case of predicting the downshift to the fourth speed stage on the basis of the vehicle information during running in the fifth speed stage, the power control device ECU places the second meshing mechanism SM2 in the fourth speed side connected state in which the fourth speed drive gear G4a and the second drive gear shaft 5 are connected to each other or in a preshift state in which the second meshing mechanism SM2 is brought close to the fourth speed side connected state. This enables a smooth downshift to the fourth speed stage without intermission of the driving force.

To establish the backward stage by using the driving force of the internal combustion engine ENG, the locking mechanism B1 is placed in the fixed state and the third meshing mechanism SM3 in the connected state in which the reverse drive gear GRa and the reverse shaft 6 are connected to each other so as to fasten the second clutch C2 to achieve the transmission state. Thereby, the rotational speed of the input shaft 2 is changed to a minus rotation (rotation in the backward direction) at the rotational speed obtained by [the number of teeth of the idle drive gear Gia/the number of teeth of the third idle driven gear Gid]×[the number of teeth of the reverse drive gear GRa/the number of teeth of the reverse driven gear GRb]×[1/i(g+1)] and is output from the output gear 3, by which the backward stage is established.

Moreover, in the backward stage, the deceleration regeneration is achieved by causing a rotor MGb rotating in the reverse direction to generate a driving force on the forward rotation side for braking and HEV running is achieved by causing the rotor MGb to generate the driving force on the reverse rotation side. Moreover, the backward stage with EV running is also able to be established by reversing the direction of the rotation of the motor generator MG with the clutches C1 and C2 in the released state and the locking mechanism B1 (brake) in the fixed state.

Furthermore, the power transmission device 1 of this embodiment includes a gradient detection unit capable of detecting the gradient (a pitching angle of the vehicle) of the road on which the vehicle is running (stopped).

Figure 2:
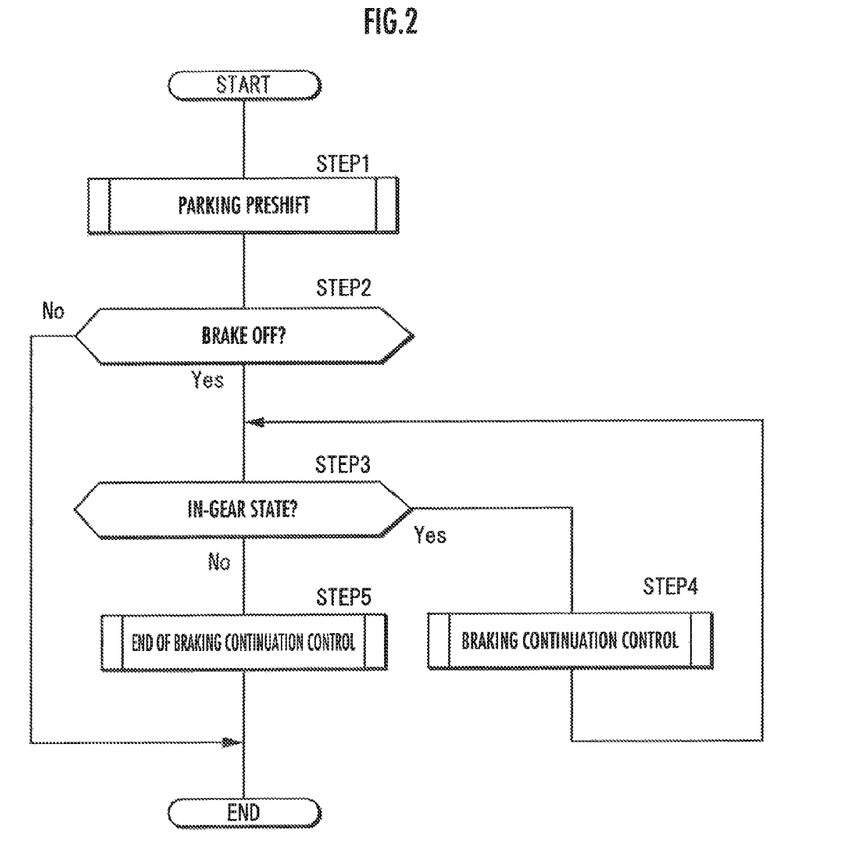
FIG. 2 is a flowchart illustrating a processing of a control unit of the power transmission device of the embodiment.
Figure 3:
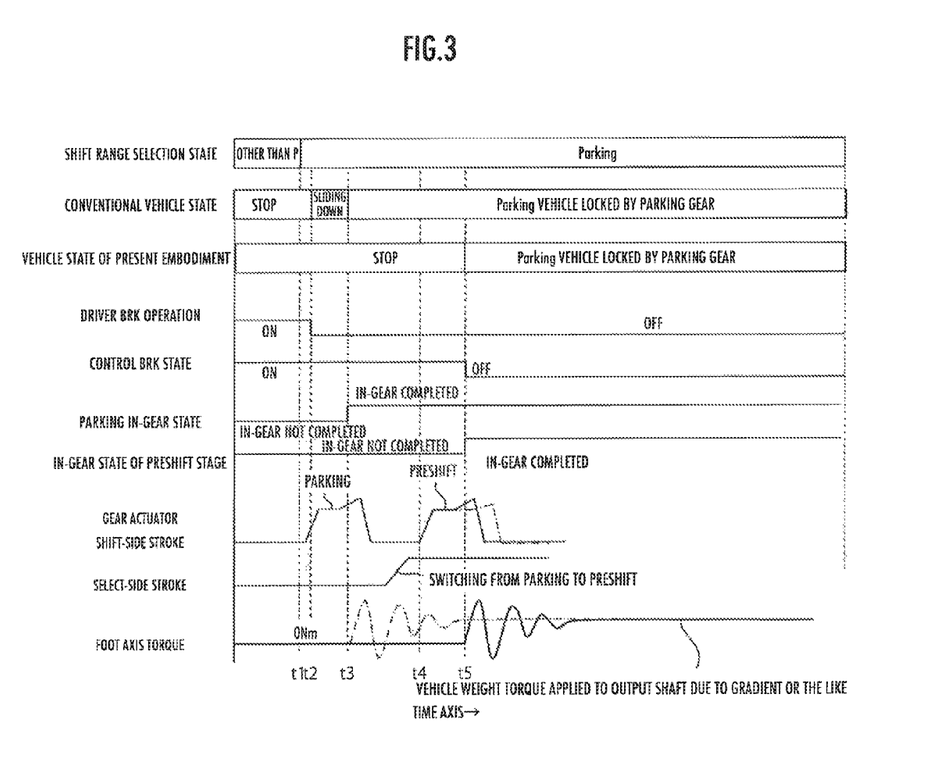
FIG. 3 is an explanatory diagram illustrating the changes of the state of the power transmission device of the embodiment.

Referring to FIGS. 2 and 3, the following describes the braking continuation processing of the power control device ECU as a control unit of this embodiment in the case of switching to the parking range by a driver's operation of the shift mechanism (shift operation) such as a gearshift lever or the like. In response to the switching to the parking range by the driver's operation of the shift mechanism (shift operation) such as a gearshift lever or the like, the power control device ECU locks the parking gear Gp in step 1 as illustrated in FIG. 2, and then places the second meshing mechanism SM2 in a second speed side connected state in which the second speed drive gear G2a and the second drive gear shaft 5 are connected to each other or in a preshift state in which the second meshing mechanism SM2 is brought close to the second speed side connected state so that the second speed stage as a variable speed stage of the preshift can be established when the vehicle starts up again.

Thereafter, the processing proceeds to step 2 to confirm whether the driver applies braking by using a braking mechanism with a brake pedal (whether or not the driver is performing the braking operation). If the driver applies braking, the current processing is ended directly.

In the case the driver does not apply braking (the braking operation is not performed) in step 2, the processing proceeds to step 3 to confirm whether or not the locking of the parking gear is completed and to confirm whether or not the switching to the second speed side connected state of the second meshing mechanism SM2 or to the preshift state for bringing the second meshing mechanism SM2 close to the second speed side connected state is completed.

In the case the locking of the parking gear is not completed or the switching to the second speed side connected state of the second meshing mechanism SM2 or to the preshift state for bringing the second meshing mechanism SM2 close to the second speed side connected state is not completed, the processing proceeds to step 4 to continue the braking with the braking mechanism regardless of whether the driver depresses the brake pedal (to hold and continue the brake state). The processing of this step 4 corresponds to braking continuation processing of the present invention.

Thereafter, returning to step 3, the power control device ECU confirms whether or not the locking of the parking gear is completed and whether or not the switching to the second speed side connected state of the second meshing mechanism SM2 or to the preshift state for bringing the second meshing mechanism SM2 close to the second speed side connected state is completed.

If the locking of the parking gear is completed and the switching to the second speed side connected state of the second meshing mechanism SM2 or to the preshift state for bringing the second meshing mechanism SM2 close to the second speed side connected state is completed in step 3, the processing branches to step 5. If the process of step 4 (braking continuation processing process) is performed, this process is ended (end process) to end the current processing. The processing in FIG. 2 is repeated at a predetermined cycle.

Moreover, FIG. 3 illustrates the changes of the state of the power transmission device 1 of this embodiment. Reference character t1 denotes the time when the driver changes a range other than the parking range such as a forward range (running range) or a neutral range to the parking range by a shift operation.

Reference character t2 denotes the time when the driver takes his/her foot off the brake pedal. As illustrated in a conventional vehicle state of the comparative example of a power transmission device to which the present invention is not applied, drive wheels are able to rotate by a clearance between a parking gear and an engaging portion engaging therewith and a clearance (backlash) of a meshing portion of the second speed gear train G2 when the driver takes his/her foot off the brake pedal in the power transmission device of the comparative example. Therefore, the vehicle slides down in the backward direction by the clearance in the case where the vehicle stops on an uphill road.

Thereby, as illustrated by an alternate long and short dash line on the foot axis torque in FIG. 3, a torsional vibration of the output shaft 3a occurs when the parking mechanism receives the vehicle weight after the end of the sliding-down. In the power transmission device of the comparative example, the torsional vibration might hinder a rapid transition to an in-gear state (a third speed connected state of the first meshing mechanism SM1 or a preshift state thereof) of a preshift stage (for example, the second speed stage) as a preparation for starting up the vehicle again.

In the power transmission device 1 of this embodiment, the braking is continuously applied until the transition to the in-gear state of the second speed stage as a preshift stage in the brake control even in the case where the driver does not depress the brake pedal. Thereby, torsion or vibration of the output shaft 3a caused by vehicle sliding-down or the like occurs after the completion of the transition to the in-gear state of the second speed stage (see the solid line in FIG. 3). This enables a smooth transition to the in-gear state of the second speed stage.

According to the power transmission device 1 of this embodiment, a preshift is able to be smoothly completed during braking continuation processing even in a situation where a torsional torque might occur in the parking state.

Moreover, the power transmission device 1 of this embodiment includes a gradient detection unit capable of detecting a gradient. The power control device ECU is configured to perform the braking continuation processing when detecting a gradient equal to or greater than a predetermined angle. Thereby, the power control device ECU performs the normal control in a situation where the output shaft 3a might not be affected by torsion, vibration, or the like.

Moreover, the drive gear is provided with a parking gear by spline connection in this embodiment. Therefore, in comparison with the case where the parking gear is provided in the output shaft 3a, the phase between the output shaft and the parking gear is allowed to be twisted extra by the clearance of the meshing portion of the gear train and the torque might increase when the vehicle weight is applied to the parking mechanism. Therefore, particularly in the power transmission device 1 where the parking gear is provided in the rotatably-supported drive gear, the present invention provides a working effect.

Although the parking gear is provided in the second speed drive gear G2a in this embodiment, the present invention is not limited thereto, and the parking gear may be provided in other portions. For example, the parking gear may be provided in the third speed drive gear G1a or in the output shaft 3a.

Moreover, while the braking continuation control is performed only in a state where the brake is off (if YES in step 2 of FIG. 2) in this embodiment, the braking continuation control of the present invention may be forcibly performed, regardless of the driver's braking operation, until the locking of the parking gear and the transition to the in-gear state of the preshift are completed, and then the braking continuation control may be ended after the completion of the transition to the in-gear state of the preshift to transition to the normal braking processing in response to a driver's braking operation.

Moreover, in this embodiment, the power transmission device has been described as one with a dual clutch transmission. The power transmission device of the present invention is not limited thereto, but may be of other types as long as a power transmission device has a plurality of gear trains for establishing variable speed stages.

Furthermore, while the power transmission device 1 including a motor generator MG has been described in this embodiment, the power transmission device does not always need to include the motor generator MG.

1 power transmission device
2 input shaft
2a pump shaft
3 output gear
3a output shaft
3b bearing for output shaft
4 first drive gear shaft
5 second drive gear shaft
6 reverse shaft
7 transmission case
7a bolt
8 pump
9 lubrication circuit
10 clutch control circuit
C1 first clutch
C2 second clutch
SM1 first meshing mechanism
SM2 second meshing mechanism
G2 second speed gear train
G2a second speed drive gear
G3 third speed gear train
G3a third speed drive gear
G4 fourth speed gear train
G4a fourth speed drive gear
G5 fifth speed gear train
G5a fifth speed drive gear
Go1 first driven gear (second/third speed driven gear)
Go2 second driven gear (fourth/fifth speed driven gear)
Gi idle gear train
GR reverse gear train
ECU power control device (control unit)
ENG internal combustion engine (drive source)
MG running electric motor (motor generator, rotary electric machine)
MGa stator
MGb rotor
MGc rotation sensor
PG planetary gear mechanism
Sa sun gear (first element)
Ca carrier (second element)
Ra ring gear (third element)
BATT secondary battery
B1 locking mechanism (brake)
Gp parking gear
LK parking mechanism
LKa engaging portion

What is claimed is:

1. A power transmission device including:
an input shaft which is rotated by power of a drive source; and
an output shaft arranged in parallel with the input shaft, wherein the rotational speed of the input shaft is changed to a plurality of stages and output from the output shaft via a plurality of gear trains with different transmission gear ratios each having a drive gear and a driven gear meshing with the drive gear,
the power transmission device comprising:
a drive gear shaft which fixes or rotatably supports the drive gears of the plurality of gear trains;
a driven gear shaft which rotatably supports or fixes the driven gears of the plurality of gear trains;
a meshing mechanism which selects any one of the gear trains and connects a gear rotatably supported by the drive gear shaft or the driven gear shaft among the drive gear and the driven gear of the selected gear train to the corresponding shaft to enable power transmission between the drive gear shaft and the driven gear shaft by the selected gear train;
a braking mechanism which brakes wheels according to a driver's braking operation;
a shift mechanism capable of switching between a running range and a parking range;
a parking mechanism, which has a parking gear to which the rotation of the driven gear shaft is transmitted and an engaging portion which engages with the parking gear to inhibit the rotation of the parking gear, inhibits the rotation of the driven gear shaft by inhibiting the rotation of the parking gear; and
a control unit which controls the meshing mechanism, the braking mechanism, and the parking mechanism,
wherein the control unit performs braking continuation processing for continuing braking of the braking mechanism regardless of the driver's braking operation in a case where the shift mechanism is switched to the parking range, inhibits the rotation of the driven gear shaft by the parking mechanism, places a predetermined meshing mechanism in a connected state as a preparation for starting up the vehicle again, and then ends the braking continuation processing.

2. The power transmission device according to claim 1, further comprising a gradient detection unit capable of detecting a gradient of a road surface,
wherein the control unit performs the braking continuation processing in a case of detecting the gradient.

3. The power transmission device according to claim 2, wherein the parking gear is provided so as to integrally rotate by spline connection in gears constituting a predetermined gear train for establishing a predetermined speed stage.

4. The power transmission device according to claim 3, wherein:
the gear train includes a drive gear and a driven gear to which the rotation of the drive gear is transmitted;
the drive gear is rotatably supported by the drive gear shaft;
the driven gear is fixed to the driven gear shaft;
the meshing mechanism is able to selectively connect any one of the drive gears of the plurality of gear trains to the drive gear shaft; and
the parking gear is provided so as to integrally rotate with the drive gear.

5. The power transmission device according to claim 1, wherein the parking gear is provided so as to integrally rotate by spline connection in gears constituting a predetermined gear train for establishing a predetermined speed stage.

6. The power transmission device according to claim 5, wherein:
the gear train includes a drive gear and a driven gear to which the rotation of the drive gear is transmitted;
the drive gear is rotatably supported by the drive gear shaft;
the driven gear is fixed to the driven gear shaft;

the meshing mechanism is able to selectively connect any one of the drive gears of the plurality of gear trains to the drive gear shaft; and the parking gear is provided so as to integrally rotate with the drive gear.

7. A method of controlling a power transmission device including an input shaft which is rotated by power of a drive source and an output shaft arranged in parallel with the input shaft, wherein the rotational speed of the input shaft is changed to a plurality of stages and output from the output shaft via a plurality of gear trains with different transmission gear ratios each having a drive gear and a driven gear meshing with the drive gear, the power transmission device including:

a drive gear shaft which fixes or rotatably supports the drive gears of the plurality of gear trains;

a driven gear shaft which rotatably supports or fixes the driven gears of the plurality of gear trains;

a meshing mechanism which selects any one of the gear trains and connects a gear rotatably supported by the drive gear shaft or the driven gear shaft among the drive gear and the driven gear of the selected gear train to the corresponding shaft to enable power transmission between the drive gear shaft and the driven gear shaft by the selected gear train;

a braking mechanism which brakes drive wheels according to a driver's braking operation;

a shift mechanism capable of switching between a running range and a parking range;

a parking mechanism, which has a parking gear to which the rotation of the driven gear shaft is transmitted and an engaging portion which engages with the parking gear to inhibit rotation of the parking gear, inhibits rotation of the driven gear shaft by inhibiting the rotation of the parking gear; and a control unit which controls the meshing mechanism, the braking mechanism, and the parking mechanism, the method of controlling the power transmission device comprising the steps of:

a performing braking continuation processing step which performs braking continuation processing for continuing braking of the braking mechanism regardless of the driver's braking operation in a case where the shift mechanism is switched to the parking range by the control unit; and an ending step for inhibiting rotation of the driven gear shaft by the parking mechanism, placing a predetermined meshing mechanism in a connected state as a preparation for starting up the vehicle again, and then ending the braking continuation processing by the control unit.

* * * * *